United States Patent [19]

Mino et al.

[11] Patent Number: 4,672,819
[45] Date of Patent: Jun. 16, 1987

[54] COOLING UNIT

[75] Inventors: Kaoru Mino; Yoshikazu Yanagisawa, both of Konan, Japan

[73] Assignee: Diesel Kiki Co., Ltd., Tokyo, Japan

[21] Appl. No.: 900,625

[22] Filed: Aug. 26, 1986

[30] Foreign Application Priority Data

Aug. 29, 1985 [JP] Japan .................. 60-132046[U]

[51] Int. Cl.$^4$ .............................................. F25D 17/06
[52] U.S. Cl. .................................... 62/298; 62/426; 165/76; 417/423 R
[58] Field of Search ................... 62/298, 429, 426; 417/423 R; 310/89; 165/76, 122

[56] References Cited

U.S. PATENT DOCUMENTS

| | | | | |
|---|---|---|---|---|
| 3,364,989 | 1/1968 | Marsteller | ..................... | 165/122 |
| 3,483,713 | 12/1969 | Cole, Jr. et al. | ................. | 62/426 |
| 3,627,442 | 12/1971 | Brandt | ..................... | 417/423 X |
| 3,756,039 | 9/1973 | Riello | ..................... | 62/429 X |
| 3,766,749 | 10/1973 | Livesay | ..................... | 62/298 X |
| 3,874,191 | 4/1975 | Hudson | ..................... | 62/426 |
| 4,340,830 | 7/1982 | Hoyer-Ellefsen | ................. | 310/89 |

Primary Examiner—William E. Tapolcai
Attorney, Agent, or Firm—Wenderoth, Lind & Ponack

[57] ABSTRACT

A cooling unit for automobile air conditioners includes a pair of scroll-shaped blower cases each composed of an upper case member integrally formed with the upper case member of a cooling case, a lower neck portion integrally formed with the lower case member of the cooling case, and a removable lower case portion detachably disposed between the upper case member and the lower neck portion. The cooling unit also includes a bracket composed of a bracket body integrally formed with the upper case member of the cooling case, and a retaining member detachably connected to the bracket body for holding a blower motor from the below. With this construction, a blower can readily be removed downwardly from the cooling unit by detaching the removable portion and the retaining member even though the cooling unit is mounted on the ceiling of a vehicle.

5 Claims, 8 Drawing Figures

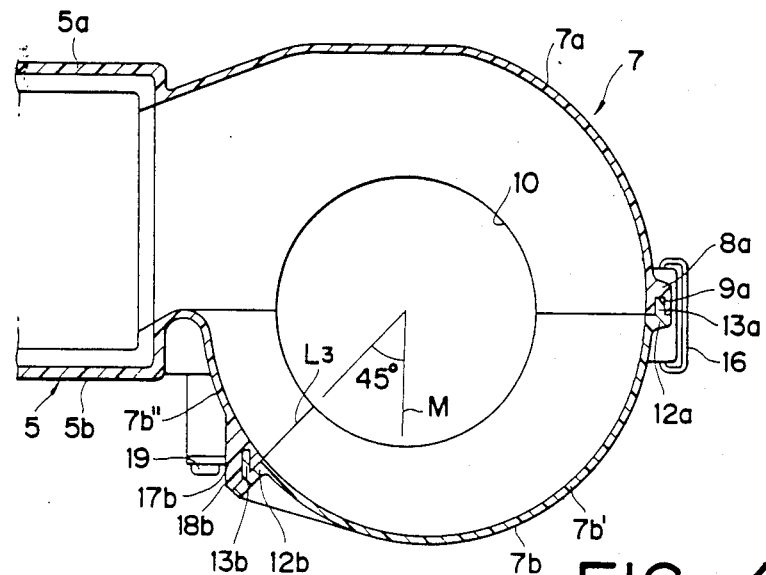
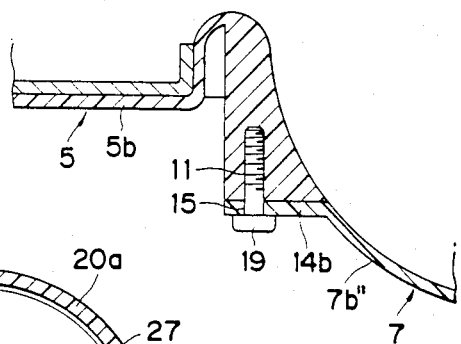
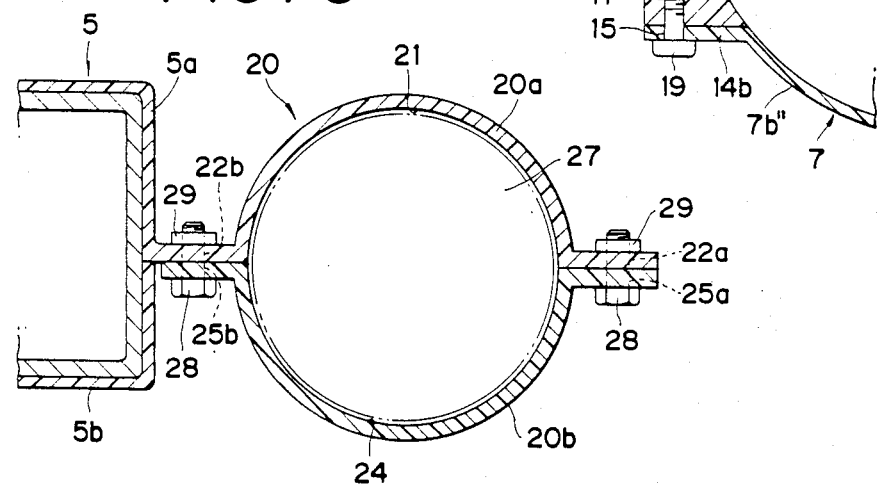

COOLING UNIT

FIELD OF THE INVENTION

The present invention relates to a cooling unit for an automobile air conditioner adapted to be mounted on the ceiling of an automobile.

PRIOR ART

An air conditioner for an automobile, such as a bus, microbus or a one-box car includes, as shown in FIG. 7, a cooling unit 3 hung on the ceiling 2 of a vehicle 1. As shown in FIG. 8, the cooling unit 3 is composed of a cooling case 5 receiving therein an evaporator 4, and a pair of blower cases 7 formed integrally with the rear end of the cooling case 5 and receiving respectively therein a pair of blower fans 6. The cooling case 5 and the blower cases 7 thus united in integral formation are vertically separable along a horizontal parting line 8 for installation of the evaporator 4 and the blower fans 6. The cooling unit 3 also includes a drive motor 9 for driving the blower fans 6. The motor 9 is mounted on a bracket (not shown) supported by a lower case member 5b of the cooling case 5.

The conventional cooling unit 3 thus constructed is attached to the vehicle ceiling 2 by means of mounting brackets (not shown) secured to an upper case member 5a of the cooling case 5.

With this construction, when a rotary component, i.e. the blower fan 6 or the motor 9 is damaged or otherwise broken down, such damaged component must be replaced either by demounting the cooling unit 3 or by removing the lower case member 5b of the cooling case 5 and integral lower case members 7b of the respective blower cases 7.

Demounting of the cooling unit 3, however, requires disassembling of various pipes in a cooling system which would cause a leakage of refrigerant gas. The leaked refrigerant gas must be recovered when reassembling the pipes with the repaired cooling unit 3. Another disadvantage is in that a tedious, time-consuming work is necessary to remove a drain hose. Furthermore, the demounting of the cooling unit 3 would result in a fault in the sealing properties of the cooling system.

On the other hand, the removal of the lower members 5b, 7b of the cooling and blower cases 5, 7 also encounters with the above-described problems except the problem caused by the disassembling of the pipes.

SUMMARY OF THE INVENTION

It is accordingly an object of the present invention to provide a cooling unit for an automobile air conditioner in which blower fans and a drive motor thereof can readily be removed without the necessity of disassembling various pipes and the lower member of a cooling case.

According to the present invention, the foregoing and other objects are attained by a cooling unit for an automobile air conditioner adapted to be mounted on the ceiling of a vehicle, comprising: a cooling case having an upper case member and a lower case member; a blower case having an upper case member and a lower case member, the upper blower case member being integral with the upper cooling case member; the lower blower case member including a removable portion and a fixed neck portion integral with the lower cooling case member, the removable portion being detachably connected by fastener means to the upper blower case member and the fixed neck portion; and a bracket for holding thereon a blower motor, the bracket including a bracket body joined with the upper cooling case member, and a retaining member detachably connected to the bracket body to support the motor from the below.

With this construction, the blower motor and the fans cam readily be removed downwardly from the cooling unit by detaching the removable portion of the lower blower case member from the upper blower case member and the fixed neck portion, and by detaching the retainer member from the bracket body even though the cooling unit is mounted on the ceiling of a vehicle.

Many other advantages, features and other objects of the present invention will become manifest to those versed in the art upon making reference to the detailed description and the accompanying sheet of drawing in which a preferred structural embodiment incorporating the principles of the present invention is shown by way of illustrative example.

BRIEF DESCRIPTION OF THE DRAWINGS

FIG. 3 is a cross-sectional view taken along line A—A of FIG. 2;

FIG. 4 is an enlarged cross-sectional view taken along line B—B of FIG. 2;

FIG. 5 is a cross-sectional view taken along line C—C of FIG. 2;

DETAILED DESCRIPTION

The invention is described herein below in detail with reference to an embodiment illustrated in the accompanying drawings.

Figure 1:
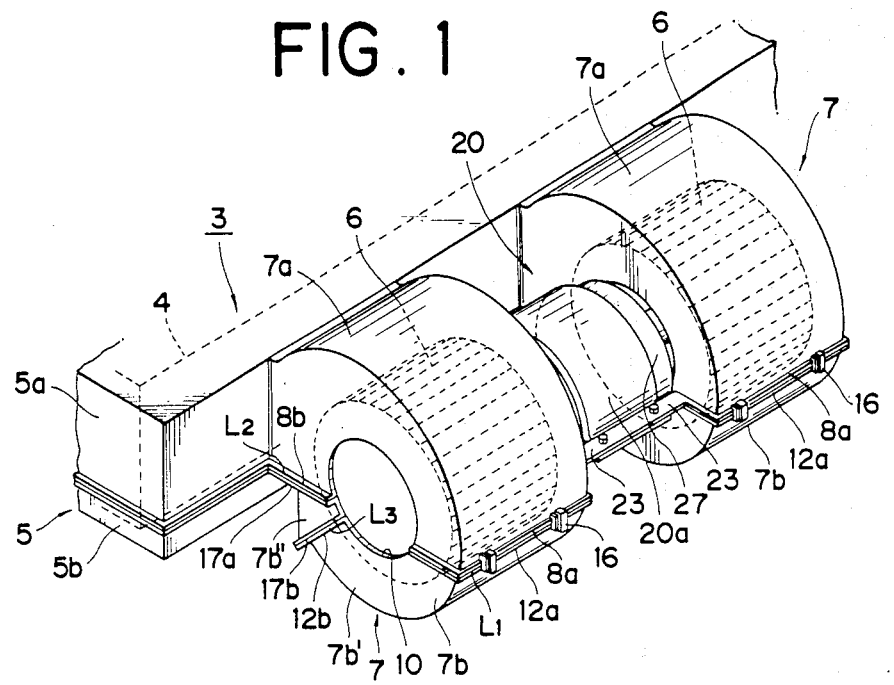
FIG. 1 is a fragmentary perspective view of a cooling unit embodying the present invention.
Figure 2:
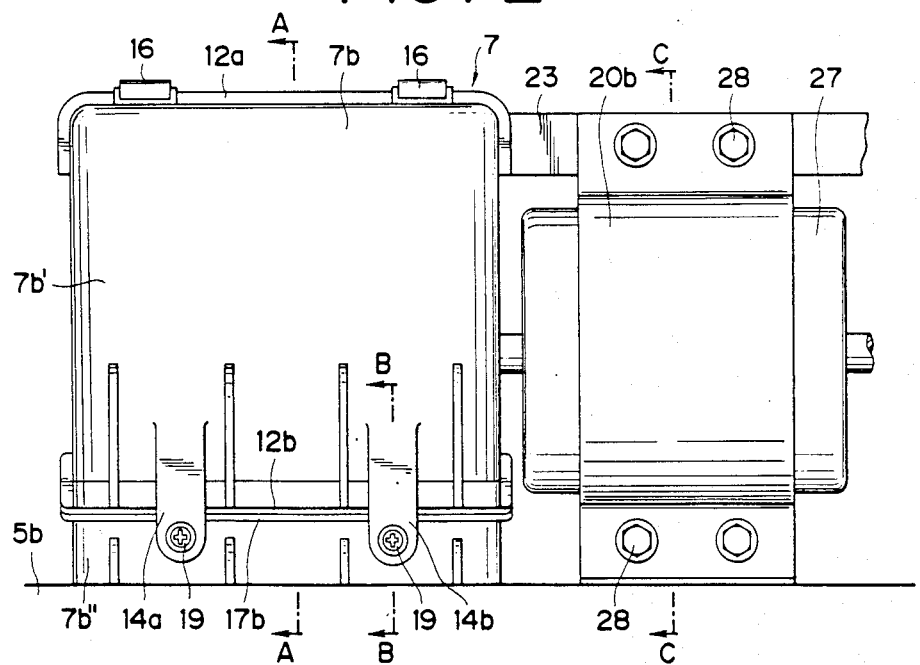
FIG. 2 is an enlarged bottom view of a portion of the cooling unit.
Figure 6:
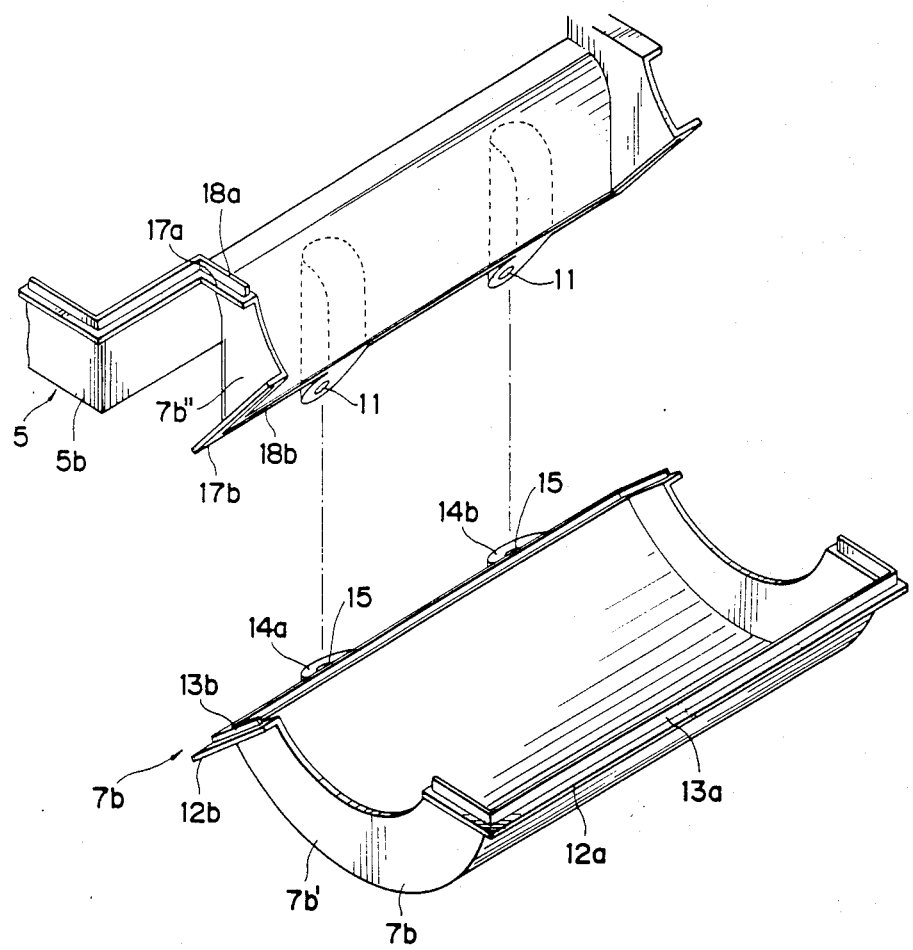
FIG. 6 is an exploded perspective view of the cooling unit.
Figure 7:
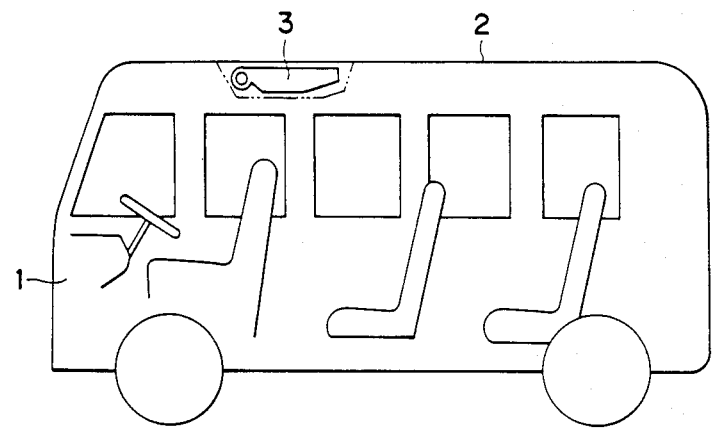
FIG. 7 is a diagramatic view showing a conventional cooling unit mounted on the ceiling of a vehicle.
Figure 8:
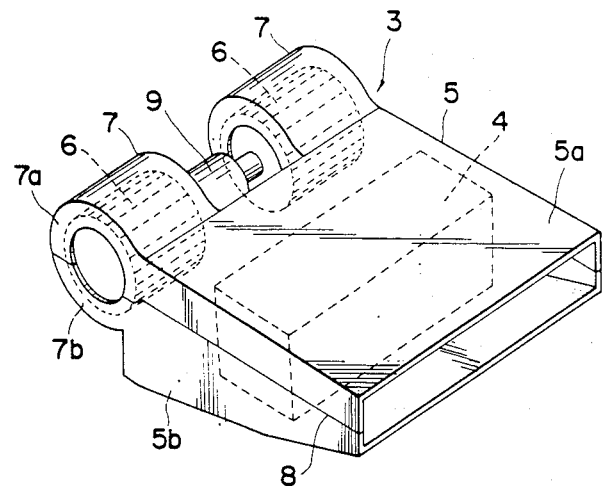
FIG. 8 is an enlarged perspective view of the conventional cooling unit.

FIGS. 1 through 6 show an end portion of a cooling unit 3 which includes a cooling case 5 and a pair of blower cases 7 joined with the cooling case 5. The cooling case 5 receives therein an evaporator 4, whereas the blower cases 7 receive respectively therein a pair of blower fans 6. The cooling case 5 is formed of a synthetic resin and has a substantially box shape vertically separated by a horizontal parting line into an upper cooling case member 5a and a lower cooling case member 5b.

The blower cases 7 have a generally scroll shape and are disposed in juxtaposition on the end of the cooling case 5 which is opposite to a blowing outlet (not shown). Each of the blower cases 7 is separated by horizontal parting lines $L_1$, $L_2$ into an upper case member 7a and a lower case member 7b. The upper member 7a of the blower case 7 is formed of a synthetic resin and integral with the upper member 5a of the cooling case 5. The upper blower case member 7a includes thickened peripheral connecting edges 8a, 8b which define the parting lines $L_1$, $L_2$. The thickened peripheral connecting edges 8a, 8b have elongate recesses 9a (the recess in the edge 8b being not shown) for fitting engagement with the lower case member 7b described below. The thickened connecting edges 8a, 8b are separated or interrupted by an air intake hole 10 in the blower case 7.

As shown in FIG. 3, the lower member 7b of the blower case 7 is composed of a removable outer portion 7b' and a fixed inner neck portion 7b'' which are separated by an oblique parting line L₃ tilted leftwards with respect to the vertical line M at an angle of 45 degrees. The removable portion 7b' includes a thickened peripheral connecting edge 12a fittedly engageable with the connecting edge 8a of the upper blower case member 7a, and an enlarged peripheral connecting edge 12b fittedly engageable with a lower connecting edge 17b of the fixed neck portion 7b''. Both connecting edges 12a, 12b have a pair of elongate projections or ribs 13a, 13b respectively.

The removable portion 7b' of the lower blower case member 7b also includes a pair of integral mounting pieces or projections 14a, 14b disposed adjacent to the connecting edge 12b and having a pair of holes 15, 15 extending respectively therethrough.

The neck portion 7b'' is formed of a synthetic resin and has one end joined integrally with the lower member 5b of the cooling case 5. The neck portion 7b'' includes an upper peripheral connecting edge 17a fittedly engageable with the connecting edge 8b of the upper blower case member 7a, and the lower peripheral connecting edge 17b fittedly engageable with the connecting edge 12b of the removable portion 7b'. The connecting edge 17a has an elongate projection or rib 18a, whereas the connecting edge 17b has an elongate recess 18b. The neck portion 7b'' also includes a pair of downwardly opening threaded holes 11, 11 alignable with the holes 15, 15 in the removable portion 7b'.

The upper and lower members 7a, 7b of the blower case 7 thus constructed are assembled together by fitting the ribs 13a, 13b of the removable portion 7b' into the mating recesses 9a, 18b in the upper case member 7a and the lower neck portion 7b'' to thereby bring the connecting edges 12a, 12b of the removable portion 7b' into fitting engagement with the connecting edge 8a of the upper case member 7a and the connecting edge 17b of the lower neck portion 7b'', respectively. Then the fittingly engaging connecting edges 8a, 12a are fastened together by a pair of fasteners, such as clips 16, and finally a pair of screws 19 is threaded respectively through the holes 15 in the mounting ribs 14a, 14b of the removable portion 7b' into the threaded holes 11, 11 in the neck portion 7b''.

The cooling unit 3 also includes a bracket 20 for supporting a blower motor 27. The motor bracket 20 has a substantially hollow cylindrical shape and is composed of a fixed bracket body 20a and a detachable retaining member 20b, the bracket body 20a and the retaining member 20b being substantially symmetric in structure. The bracket body 20 is formed of a synthetic resin and integral with the upper member 5a of the cooling case 5. The thus cantilevered bracket body 20a is disposed between the two blower cases 7 and includes a central holding portion of a semi-circular cross section and a pair of inner and outer connecting flanges (not designated) extending outwardly from the opposite edges of the central holding portion 21, the outer connecting flange being connected to the upper members 7a of the blower cases 7 by means of a connecting bar 23. Each of the connecting flanges has a pair of threaded holes 22a, 22b. Likewise, the retaining member 20b includes a central supporting portion 24 of a semi-circular corss section and a pair of mounting holes 25a, 25b defined therein on either side of the central supporting portion 24. The blower motor 27 is disposed between the holding portion 21 of the bracket body 20a and the supporting portion 24 of the retaining member 20b. The bracket body 20a and the retaining member 20b are fastened together by bolts 28 extending through the holes 22a, 22b and 25a, 25b and nuts 29 threaded over the bolts 28.

For assembling the cooling unit 3, the upper and lower members 5a, 5b of the cooling case 5 are connected together with the evaporator 4 disposed therebetween. Then the drive motor 27, with two fans 6, 6 supported by the drive motor 27 on opposite side thereof, is supported on the supporting portion 24 of the retaining member 24 and is lifted upwardly into contact with the holding portion 21 of the bracket body 20a. While keeping this condition, the retaining member 20b and the bracket body 20a are fastened together by means of the bolts and nuts 28, 29.

Thereafter, the removable portion 7b' of the lower blower case member 7b is preassembled with the upper blower case member 7a and the neck portion 7b'' of the lower blower case member 7b' through the fitting engagement of the ribs 13a, 13b with the mating recesses 9a, 18a. The preassembled blower case components 7a, 7b', 7b'' are firmly secured together by the clips 16 fastened to the connecting edges 8a, 12a and by the screws 19 threaded through the holes 15 into the threaded holes 11, thereby joining the upper and lower case members 7a, 7b of the blower case 7.

The assembled cooling unit 3 is then mounted on the ceiling of a vehicle. When the motor 27 is damaged or broken down, the removable portion 7b' of the lower blower case member 7b is detached downwardly by removing the clips 16 and the screws 19 and, at the same time, the retaining member 28b of the bracket 20 is detached downwardly by removing the bolts and nuts 28, 29, thereby replacing the damaged motor 27. In this instance, disassembling of refrigerant pipes and a drain hose is not necessary.

Obviously, many modifications and variations of the present invention are possible in the light of the above teachings. It is therefore to be understood that within the scope of the appended claims, the invention may be practiced otherwise than as specifically described.

What is claimed is:

1. A cooling unit for an automobile air conditioner adapted to be mounted on the ceiling of a vehicle, comprising:
    (a) a cooling case having an upper case member and a lower case member;
    (b) a blower case having an upper case member and a lower case member, said upper blower case member being integral with said upper cooling case member;
    (c) said lower blower case member including a removable portion and a fixed neck portion integral with said lower cooling case member, said removable portion being detachably connected by fastener means to said upper blower case member and said fixed neck portion; and
    (d) a bracket for holding thereon a blower motor, said bracket including a bracket body joined with said upper cooling case member, and a retaining member detachably connected to said bracket body to support the motor from below.

2. A cooling unit according to claim 1, said fastener means including at least one screw for connecting said removable portion with said fixed neck portion.

3. A cooling unit according to claim 1, said fastener means including at least one clip for connecting said removable portion to said upper blower case member.

4. A cooling unit according to claim 1, said retaining member being connected to said bracket body by means of at least one threaded fastener.

5. A cooling unit according to claim 1, said bracket body having an end remote from said upper cooling case member, said remote end being connected to upper blower case by a connecting bar.

* * * * *